C. H. FULLER.
Stuffing-Box.
No. 213,649.  Patented Mar. 25, 1879.
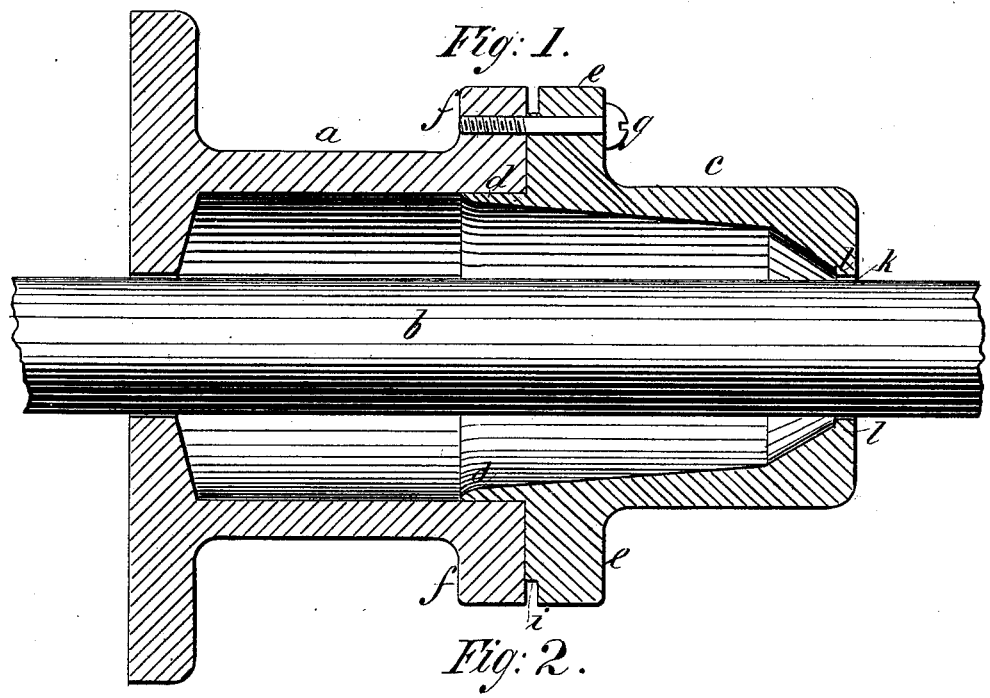
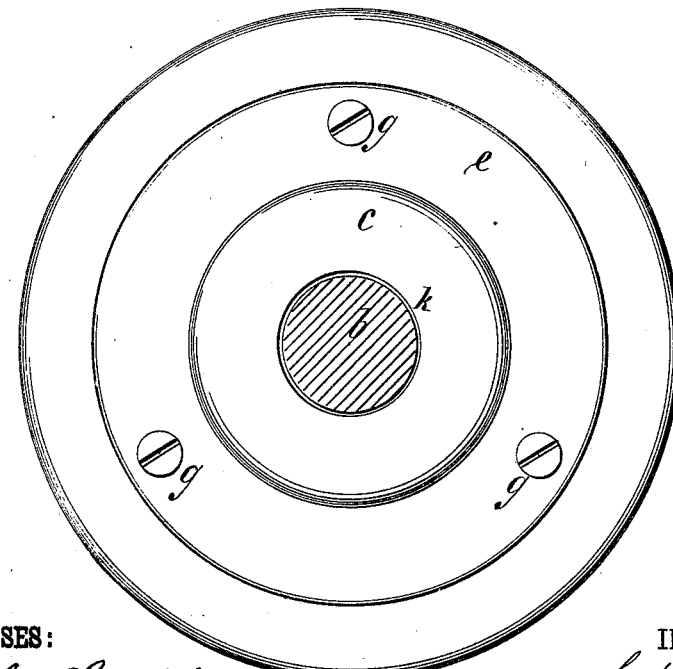
WITNESSES:
Achilles Schehl.
C. Sedgwick
INVENTOR:
C. H. Fuller
BY Munn & Co
ATTORNEYS.

UNITED STATES PATENT OFFICE.

CHARLES H. FULLER, OF AKRON, OHIO.

IMPROVEMENT IN STUFFING-BOXES.

Specification forming part of Letters Patent No. 213,649, dated March 25, 1879; application filed October 4, 1878.

*To all whom it may concern:*

Be it known that I, CHARLES H. FULLER, of Akron, in the county of Summit and State of Ohio, have invented a new and Improved Stuffing-Box, of which the following is a specification:

My improvement relates to stuffing-boxes for the piston-rod of steam-engines, pumps, presses, or other machines having a reciprocating or rotary piston in connection with a steam or air cylinder.

My invention consists in a hollow gland, forming part of the stuffing-box, and connected to the same by screw-bolts that pass through flanges on the gland and box. The gland is formed with an annular flange, that enters the stuffing-box, forming a steam-tight joint, and preventing the packing from getting between the gland and box. A shoulder is formed around the opening for the piston-rod, to prevent any binding action of the packing between the gland and rod.

In the accompanying drawings, Figure 1 is a vertical longitudinal section of my improved stuffing-box, and Fig. 2 is an end view of the same.

Similar letters of reference indicate corresponding parts.

$a$ is the stuffing-box, that is formed with or attached to the cylinder-head, as usual. $b$ is the piston-rod, that passes through the stuffing-box and gland.

The gland $c$ is hollow, the interior of the same being somewhat conical, and its hollow interior forms part of the box or space into which the packing material is placed.

At the outer edge of the opening in gland $c$ is an annular rim or flange, $d$, which enters within the stuffing-box $a$, for the purpose of rendering the joint between the box and gland steam-tight, as well as preventing the packing material from getting into the joint. This rim $d$ forms a guide for retaining the gland in place, and it also prevents pressure upon the piston-rod by canting of the gland.

The flange $e$ of the gland $c$ and the flange $f$ of the box $a$ are connected together by the screw-bolts $g$; and I prefer to form a boss, $i$, upon the face of the flange $e$, which boss abuts against the face of flange $f$.

At the inner side of the gland, and around the opening $k$, through which the piston passes, is a shoulder, $l$. If the conical sides of the gland were continued on the same line to the opening $k$, the packing material would become jammed and bind upon the piston, and thereby cause heating. The shoulder $l$ acts as a stop to the packing, and prevents any jamming or binding action.

An oil-box is to be secured upon the upper part of the gland $c$.

The advantages of the above-described box are, that the amount of packing used at one time is increased, while at the same time there is no waste, as the old packing can remain in the box and new packing be added, as required. The packing cannot be tightened beyond a certain point, and there is consequently no risk of destroying the elasticity of the packing by too much compression.

Having thus described my invention, I claim as new and desire to secure by Letters Patent—

The combination, with the stuffing-box $a$, having flange $f$, of a gland, $c$ $d$, having shouldered central opening, $k$ $l$, at one end, and at the other end a flange, $e$, that fits in close contact with flange $f$ of the box, constructed and arranged as and for the purpose specified.

CHARLES HENRY FULLER.

Witnesses:
C. H. BOONE,
J. C. CLIPPINGER.